United States Patent [19]

Laprade et al.

[11] Patent Number: 5,193,179
[45] Date of Patent: Mar. 9, 1993

[54] ACTIVITY MONITOR SYSTEM NON-OBTRUSIVE STATISTICAL MONITORING OF OPERATIONS ON A SHARED BUS OF A MULTIPROCESSOR SYSTEM

[75] Inventors: Maria Laprade, Palm Bay, Fla.; Thomas L. Sterling, Crofton, Md.

[73] Assignee: Harris Corporation, Melbourne, Fla.

[21] Appl. No.: 664,508

[22] Filed: Mar. 5, 1991

Related U.S. Application Data

[63] Continuation of Ser. No. 243,526, Aug. 9, 1988, abandoned.

[51] Int. Cl.⁵ .................................. G06F 11/34
[52] U.S. Cl. .................... 395/575; 364/264.4; 364/264; 364/230; 364/264.7; 364/DIG. 2
[58] Field of Search ... 364/200 MS File, 900 MS File, 364/51.01, 554, 570, 571.04; 395/500, 575; 371/16.1, 16.5, 19, 20.1

[56] References Cited

U.S. PATENT DOCUMENTS

| | | | |
|---|---|---|---|
| Re. 31,407 | 10/1983 | Furtman | 364/200 |
| 4,213,178 | 7/1980 | Diez | 364/200 |
| 4,247,894 | 1/1981 | Beismann | 364/200 |
| 4,281,380 | 6/1981 | Demesa | 364/200 |
| 4,363,096 | 12/1982 | Comfort | 364/200 |
| 4,367,525 | 1/1983 | Brown | 364/200 |
| 4,509,117 | 4/1985 | Korowitz | 364/200 |
| 4,511,969 | 4/1985 | Koenig | 364/200 |
| 4,531,238 | 7/1985 | Rawson | 455/9 |
| 4,547,850 | 10/1985 | Genma | 364/200 |
| 4,574,350 | 3/1986 | Starr | 364/200 |
| 4,590,550 | 5/1986 | Eilert | 364/200 |
| 4,692,862 | 9/1987 | Cousin | 364/200 |
| 4,719,567 | 1/1988 | Whittington | 364/200 |
| 4,744,023 | 5/1988 | Welsch | 364/200 |
| 4,814,984 | 3/1989 | Thompson | 364/200 |
| 4,872,121 | 10/1989 | Chan | 364/551.01 |
| 4,947,393 | 8/1990 | Paul | 371/16.1 |

Primary Examiner—Lawrence E. Anderson
Assistant Examiner—Eric Coleman
Attorney, Agent, or Firm—John L. DeAngelis, Jr.

[57] ABSTRACT

An activity monitor for monitoring activity on a bus connecting a plurality of processors, monitors the bus to determine the bus master and other bus activities. In response thereto, predetermined memory locations are enabled to count events on the bus or calculate time spans for various bus activities.

7 Claims, 5 Drawing Sheets

```
  f     d c           8           4        1
┌──┬──┬──┬────────┬────────┬────────┬──┬──┐
│ 0│ 0│ t│ mstr(4)│ mblk(4)│prmtr(3)│ 0│ 0│
└──┴──┴──┴────────┴────────┴────────┴──┴──┘
```

FIG.6

| MEMORY ACCESS PARAMETER CODES ||
| prmtr | REGISTER FUNCTION |
| --- | --- |
| 0 | # SUCCESSFUL TAS |
| 1 | # FAILED TAS |
| 2 | # BUS ERRORS |
| 3 | BUS ERROR TIME |
| 4 | # READS |
| 5 | # WRITES |
| 6 | READ ACCESS TIME |
| 7 | WRITE ACCESS TIME |

FIG. 7

```
  f                    9 8         5        1
┌──┬──┬──┬──┬──┬──┬──┬──┬──┬──┬────────┬──┬──┐
│ 0│ 1│ 0│ 0│ 0│ 0│ t│ 0│ 0│ 0│ mstr(4)│ 0│ 0│
└──┴──┴──┴──┴──┴──┴──┴──┴──┴──┴────────┴──┴──┘
```

FIG.8

```
   7                3  2  1  0  ┌84
┌────────┬──┬──┬──┬──┐
│ mstr(4)│ x│fr│ba│ma│
└────────┴──┴──┴──┴──┘
```

```
┌───┬───┬──┬──┬──┬──┬──┬──┬──┬──┬──┬──┬──┬──┬──┐
│ftr│ftc│ b│ a│ 9│ 8│ 7│ 6│ x│am│ 5│ 4│ 3│ 2│ 1│ 0│
└───┴───┴──┴──┴──┴──┴──┴──┴──┴──┴──┴──┴──┴──┴──┘
```

FIG.11

ACTIVITY MONITOR SYSTEM NON-OBTRUSIVE STATISTICAL MONITORING OF OPERATIONS ON A SHARED BUS OF A MULTIPROCESSOR SYSTEM

This is a continuation of application Ser. No. 243,526, filed on Aug. 9, 1988, now abandoned.

FIELD OF INVENTION

This invention relates to a method and apparatus for monitoring system activity at various locations in a multiprocessor computer system.

BACKGROUND OF THE INVENTION

The future of high performance computing depends on current research in parallel processing architectures and techniques, which in turn requires effective tools to explore parallel processing program characteristics and parallel architecture behavior. One such tool, the simulator, has been widely employed due to its flexibility. Unfortunately, the simulator suffers from innate slowness that restricts the applications capable of running on the simulated target machine. Another available tool is the parallel computer itself, including experimental and commercial multiprocessors and single-instruction-multiple-data stream (SIMD) machines capable of executing serious parallel algorithms in an acceptable time. While these powerful systems enable programmers to run significant applications and make coarse adjustments in the software, they do not permit easy evaluation of behavioral details in real time. Prior art software for making such detailed measurements is instrusive, perturbing the behavior or the parallel system by the very act of measurement.

While software simulation can provide detailed traces of any activity within a modeled computer, system, often producing enormous amounts of information, real time instrumentation cannot access all of the elements of the system. Real time instrumentation usually does not have the time and storage resources available to collect exhaustive traces in a nonintrusive manner. Fortunately, often a simple set of statistics, rather than a complete time domain trace, is sufficient. In these cases, real time instruments can be devised that record these statistics instead of progressing through the intermediate step of acquiring a time trace first.

One software based instrumentation system is described and claimed in the copending and commonly-owned United States Patent application entitled, "Method and Apparatus for Monitoring Software," filed on Apr. 4, 1986, Ser. No. 848,013. This software system monitor provides the necessary hardware support for monitoring software behavior in a nearly nonintrusive manner. The programmer divides the application program into a set of mutually exclusive, collectively exhaustive program segments. As execution shifts from one segment to another, the application program informs the software monitor of this transition. The monitor accumulates the number of segment entries, the total time spent in each segment, and also tracks nested interrupts. The monitor accumulates these statistics in memory for later analysis by the user.

SUMMARY OF THE INVENTION

The present invention is an apparatus for monitoring the hardware activity of a multiprocessor system. The apparatus nonintrusively monitors certain physical operations within a parallel processing system to determine the time each processor spends performing these activities. This information is critical to determining the contributing sources of performance degradation and of their sensitivities to various exigent conditions. Such measurements can also help in establishing efficient run time strategies for resource management with the parallel processing system. These measurements can also contribute to a better understanding of the scaling properties of a multiprocessor under the control of specific user application programs. The hardware activity monitor of the present invention is intended to compliment the software monitor described above. While the latter monitors software behavior by timing stages of program execution, the former monitors hardware by timing specific primitive hardware functions within the parallel processing system. Together, these imbedded instruments permit evaluation of time expenditures during program execution.

The activity monitor of the present invention monitors activity on a cluster common bus that interconnects a plurality of processors into a cluster. Several such clusters are connected to form a parallel processing system. The present invention collects statistics concerning the timing of primitive functions occurring on the bus. The device operates in a slave mode and in one embodiment is assigned a 64 Kbyte block of local memory address. The activity monitor responds to read and write commands from the processors to return statistical results and to control its internal operation. In one embodiment a plurality of processors are arranged in each of several clusters and the activity monitor of the present invention monitors behavioral statistics associated with each processor within each cluster. Some additional statistics collected relate to an entire cluster. Except for the operation of starting and stopping the timing measurements, operation of the activity monitor is entirely nonintrusive.

The activity monitor enables the multiprocessor user to acquire a number of hardware behavior measurements that fall into two general classes. The first is the enumeration of events such as the number of times a processor performs a read to a block of memory or the number of bus errors experienced. The second class is a sum of time intervals associated with various behaviors, for instance, the total time a processor spends writing to a given memory block or the total time a processor waits to gain access to the cluster common bus. For experiments that are too long, relative to the register size, there is always a chance that one or more of the internal counters or timer registers will overflow, yielding a wrong answer. To avoid this problem, the activity monitor includes overflow flags for all registers to verify the correctness of their contents.

There are a multitude of applications for the information collected by the activity monitor of the present invention. Included among these uses are system model development and evaluation, mechanisms study, detection of system bottlenecks, resource utilization measurements, algorithmic parallelism studies, fine tuning of application code, testing of alternate run time strategies, scalability measurements, and further hardware instrumentation developments.

BRIEF DESCRIPTION OF THE DRAWINGS

The present invention can be more easily understood, and the further advantages and uses thereof more readily apparent, when considered in view of the description of the preferred embodiments and the following figures in which.

DESCRIPTION OF THE PREFERRED EMBODIMENTS

Figure 1:
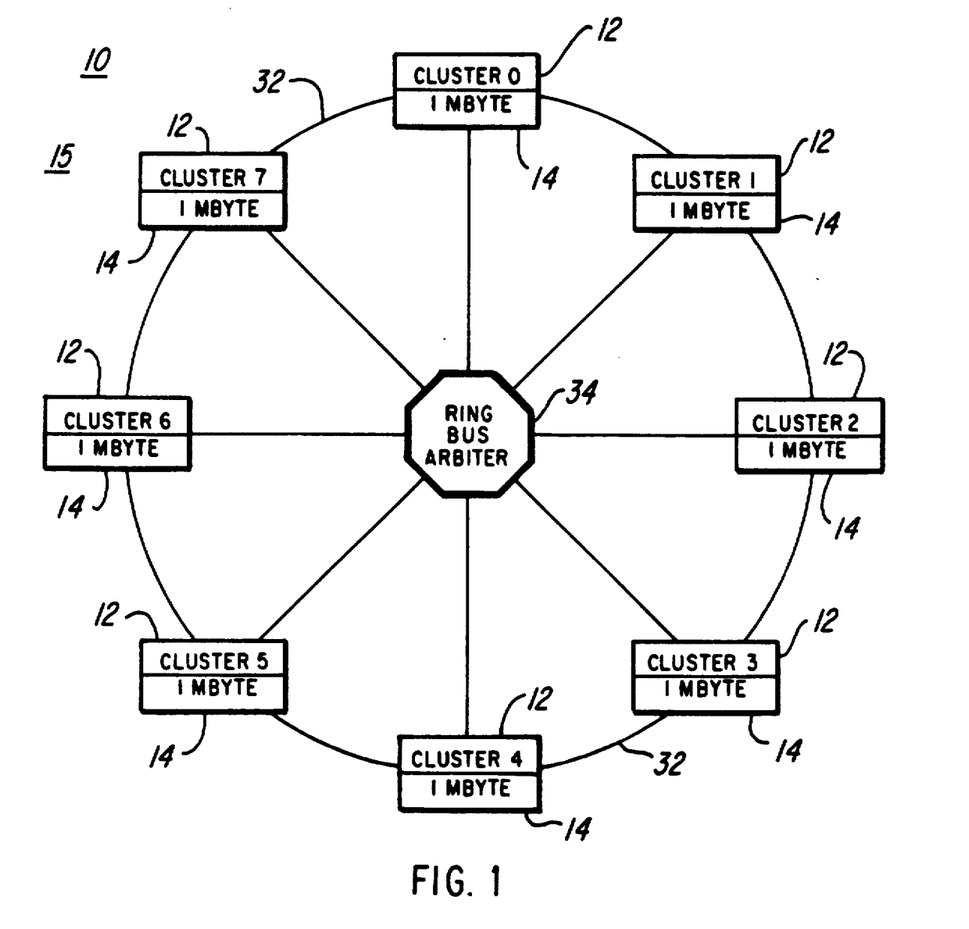
FIG. 1 is a block diagram of a first multiprocessor system that can be monitored by the activity monitor of the present invention.

FIG. 1 shows a multiprocessor system 10 comprising a plurality of clusters 12, with each cluster 12 including a memory module 14. In the FIG. 1 embodiment there are eight clusters designated cluster 0 through cluster 7. The eight memory modules 14 together constitute a global memory 15. In FIG. 1, the memory modules 14 are shown as one megabyte, but those skilled in the art will realize that any memory size can be used. Each cluster 12 includes eight microprocessors (not shown in FIG. 1) for a total of 64 microprocessors in the multiprocessor system 10.

Figure 2:
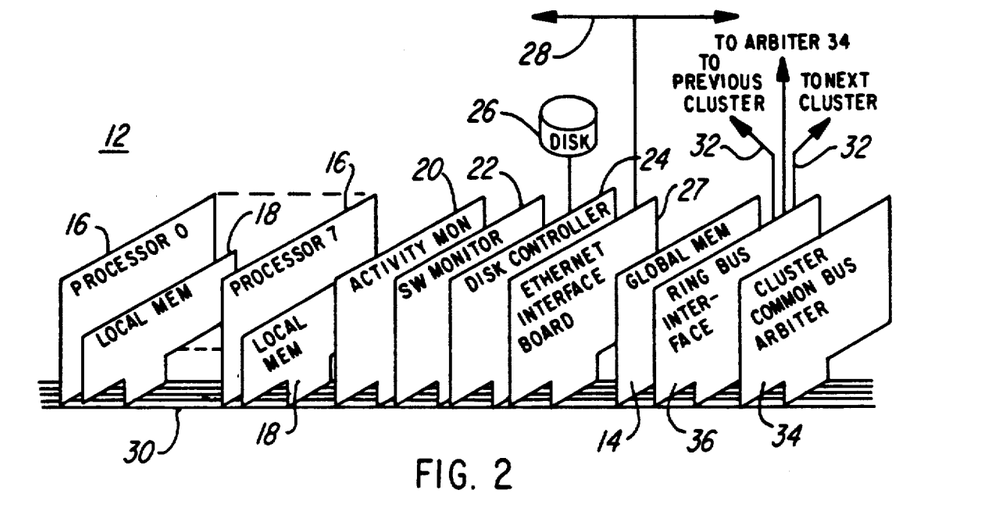
FIG. 2 is a block diagram of one of the plurality of clusters illustrated in FIG. 1.

A single cluster 12 is illustrated in FIG. 2. Each cluster 12 includes eight microprocessors 16 (designated as processors 0 through 7 in FIG. 2) coupled to a local memory unit 18. The cluster 12 also includes an activity monitor 20, which is described later and claimed herein. A software monitor 22 is also included within each cluster 12; this software monitor is described and claimed in the previously referenced patent application entitled "Method and Apparatus for Monitoring Software." The cluster 12 also includes a disk controller 24 and a disk 26. Communications to the outside environment is provided via an Ethernet interface board 27 and an Ethernet communications link 28. (Ethernet is a trademark of the Xerox Corporation.) The memory module 14 is also illustrated in FIG. 2. A processor 16 accessing a memory module 14 within its cluster uses a cluster common bus 30, while memory modules 14 in other clusters are accessed via a ringbus 32 illustrated in FIG. 1. In one embodiment the internal bus 30 is a bus defined by Institute of Electrical and Electronic Engineers (IEEE) Standard 796. A ringbus arbiter 34 (see FIG. 1) processes requests for access to the ringbus from the clusters 12, and establishes nonoverlapping paths between the requesting cluster and the desired memory module 14 of the global memory 15. Each cluster 12 is attached to the ringbus 32 via a ringbus interface board 36 that is illustrated in FIG. 2. The cluster common bus 30 provides the medium for all intracluster communications. A cluster common bus arbiter 36 processes requests for access to the cluster common bus 30 and establishes appropriate nonoverlapping paths for communications between the requesting processor 16 and the target.

Figure 3:
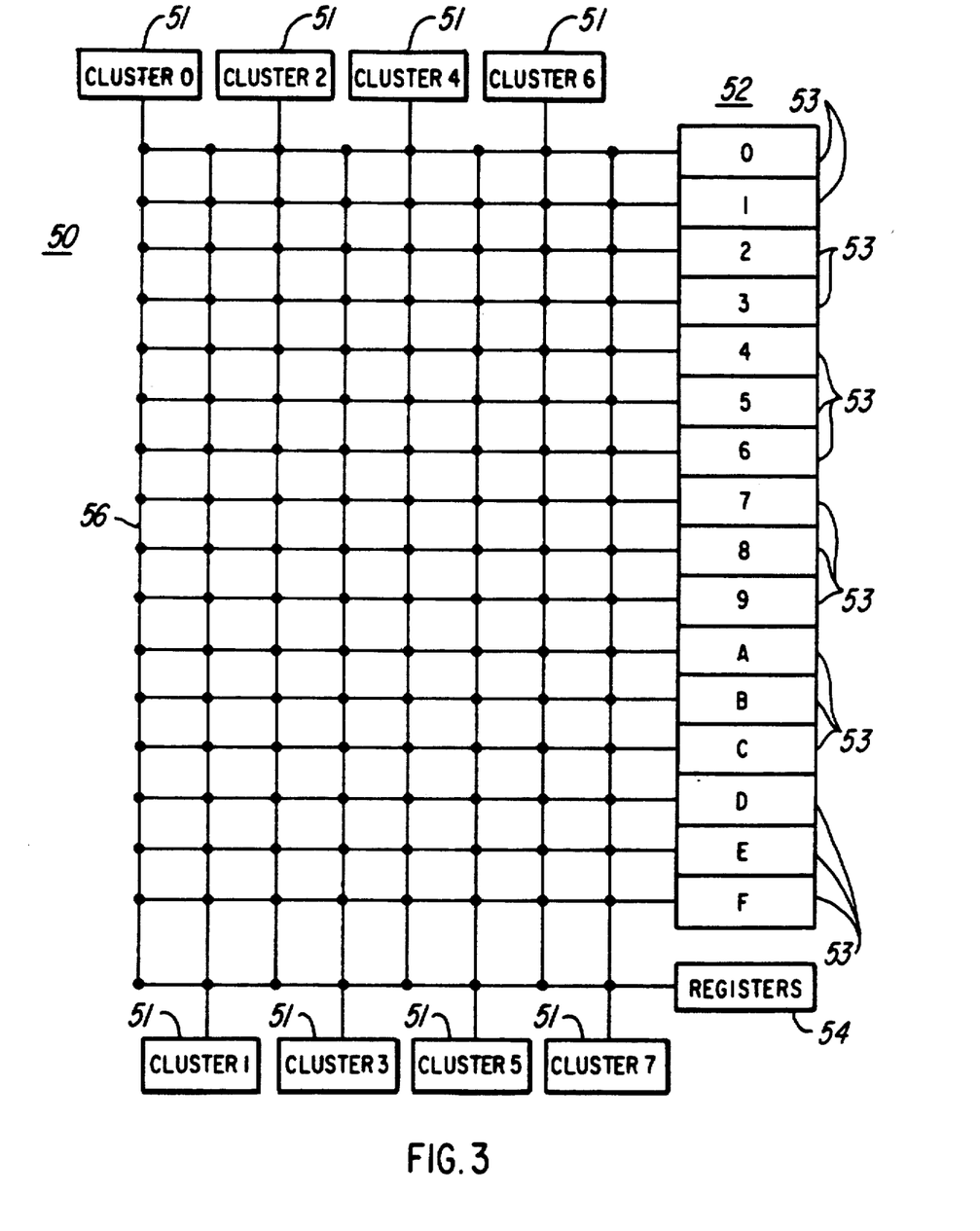
FIG. 3 is a block diagram of a second multiprocessor system that can be monitored by the activity monitor of the present invention.
Figure 4:
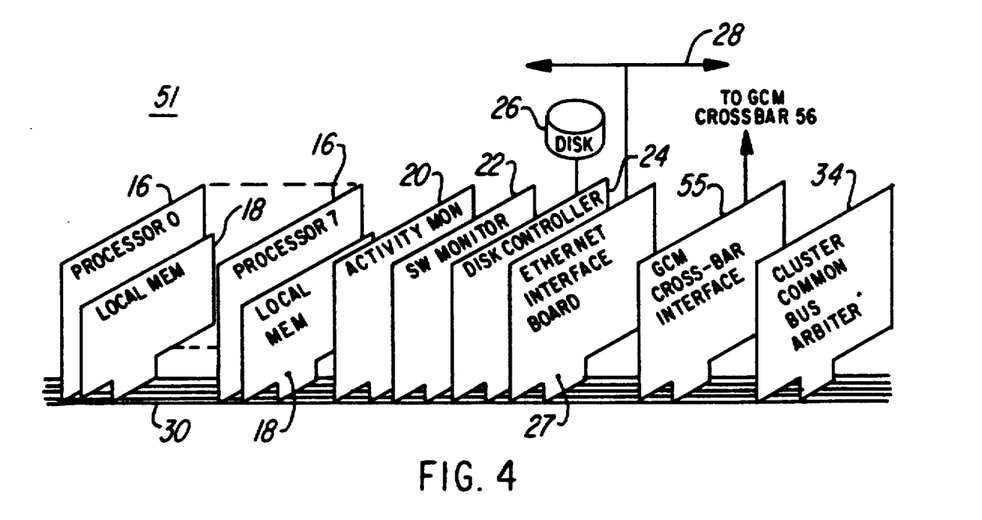
FIG. 4 s a block diagram of one of the plurality of clusters illustrated in FIG. 3.

FIG. 3 illustrates another configuration of a multiprocessor system, herein referred to as a multiprocessor system 50. The multiprocessor system 50 employs a conventional global communications mechanism (GCM) cross-bar switch architecture 56 to connect clusters 51 to a global memory 52 and to global registers 54. In this embodiment the global memory 52 is organized in a 16-way interleaf structure of 512 Kbyte blocks each referred to as a memory block 53 (designated 0 through F). This interleaving reduces possible memory contention by distributing memory references across the memory blocks 53. The global registers 54 are used for sharing system-wide control states among all processors 16, such as global interrupt and reset locations. FIG. 4 illustrates a cluster 51, which is identical to the cluster 12, except that the ringbus interface 36 of FIG. 2 is replaced by a global communications mechanism (GCM) cross-bar interface 55 in FIG. 4.

For the user to understand the performance of a multiprocessor system, such as the multiprocessor system 50, it is necessary to understand the factors that contribute to performance degradation. It is the objective of the activity monitor 20 constructed according to the teachings of the present invention to aid in the quantifying and reduction of these losses so that overall performance can be improved. There are four general sources of losses that must be observed to characterize multiprocessor performance. These include: starvation, contention, overhead, and latency. Starvation is the time a processor is idle due to inadequate parallelism in the application program. Contention is the delay experienced by a processor attempting to obtain exclusive access to a shared resource already in use. For example, two processors accessing the same queue must serialize their accesses to retain queue integrity. Overhead is the work that must be performed by a processor to manage the application program's parallelism. This work would not need to be performed by a uniprocessor executing the same application. Overhead includes synchronization, task creation, and task scheduling. Lastly, latency is the time required to access distant memory objects in the systems with distributed communication and memory, including the impact of cache misses due to frequent contact switching. Measuring each of these parameters permits the characterization of the multiprocessor performance.

In the multiprocessor architecture, such as the multiprocessor system 50, performance losses due to hardware operations include contention for access to shared physical resources and latency of access to nonlocal objects. Contention occurs when multiple processors 16 require simultaneous access to the same internal bus 30 or memory block 53. Losses resulting from latency occur when a processor 16 must access data in the global memory 52, which has a slower cycle time than the local memory unit 18. Global memory latency is the global memory cycle time, plus global communication arbitration time, plus contention for an individual global memory block. In the multiprocessor system 50 the loss resulting from memory block contention can be determined by measuring the uncontended cycle time and subtracting this from the total memory access time. Neither of these types of losses occur in a uniprocessor architecture (with the possible exception of latency to memory on a cache miss); such degradation is solely attributable to the parallel processing architecture.

The activity monitor 20 installed in each cluster 51 (and each cluster 12 in the FIG. 2 embodiment) measures the time each processor 16 spends waiting for and using the internal bus 30 and accessing a local memory unit 18 or a memory block 53. The activity monitor 20 measures several aspects of activity on the cluster common bus 30, including: free time (the time in which the cluster common bus 30 is idle), wait time (the time a processor 16 spends contending for use of the cluster common bus 30), and access time (the time the processor 16 spends using the cluster common bus 30). The activity monitor 20 also counts read and write operations within each memory block 53.

Another source of loss is contention for shared data structures protected by some mutual exclusion discipline, such as atomic test-and-set operations. An atomic operation is an instruction that is completed without interruption, in this way keeping the parallel processes synchronized. Although this type of loss is not hardware degradation, the activity monitor 20 can be used to estimate it by counting the number of successful and unsuccessful test-and-set (TAS) operations for each processor 16. The ratio of failed to successful TAS operations indicates the performance loss caused by contention for shared data structures.

There are three degrees of specificity of time measurements performed by the activity monitor 20. These time measurements can be global (i.e., for the entire multiprocessor system 50), per processor 16, or per processor 16 and memory block 53. With respect to the embodiments of FIGS. 3 and 4, the activity monitor 20 views its world as a group of eight processors 16 connected to the sixteen memory blocks 53 via the internal bus 30. At any given time one of the processors 16 is using the internal bus 30, i.e., is the bus master. The activity monitor 20 monitors both the signals on the cluster common bus 30 as well as arbitration signals. There is at least one timing parameter, i.e., bus free time, is that is global in the se that it relates to entire cluster 51 (or 12 in FIG. 2). This parameter measures the time the cluster common bus 30 is free. A second group of timing parameters, i.e., bus acquisition time, are determined on a per processor basis, that is, there is a separate measurement made and stored for each processor 16. Finally, there are a number of collected time statistics that are distinguished both by processor 16 and by memory block 53 addressed at the time of the measurement. These include the atomic test-and-set operations discussed above, bus error time, write cycle time, and read cycle time.

In addition to the time measurements, there are also five types of event enumeration statistics collected by the activity monitor 20 for each processor 16 in a cluster 51. These are the number of reads performed by the processor 16 in each of the memory blocks 53, the number of writes performed by each processor 16 to each of the memory blocks 53, the number of successful TAS operations performed to each memory block 53, the number of failed TAS operations performed by a processor 16 to each memory block 53, and the number of bus errors by a processor 16.

Using the information collected as described above, the activity monitor 20 provides two important types of information about parallel programs running on the multiprocessor system 50 (FIG. 3) or the multiprocessor system 10 (FIG. 1). First, the data gives a measure of the demand for global resources imposed by each processor 16 and the tasks executed. Second, the activity monitor 20 provides an accurate measure of the performance losses resulting from the multiprocessor architecture. Together, this information enables investigators to derive averages of computing profile parameters and to distinguish between the consequences of the application algorithms and the artifacts of the particular architecture employed.

Figure 5:
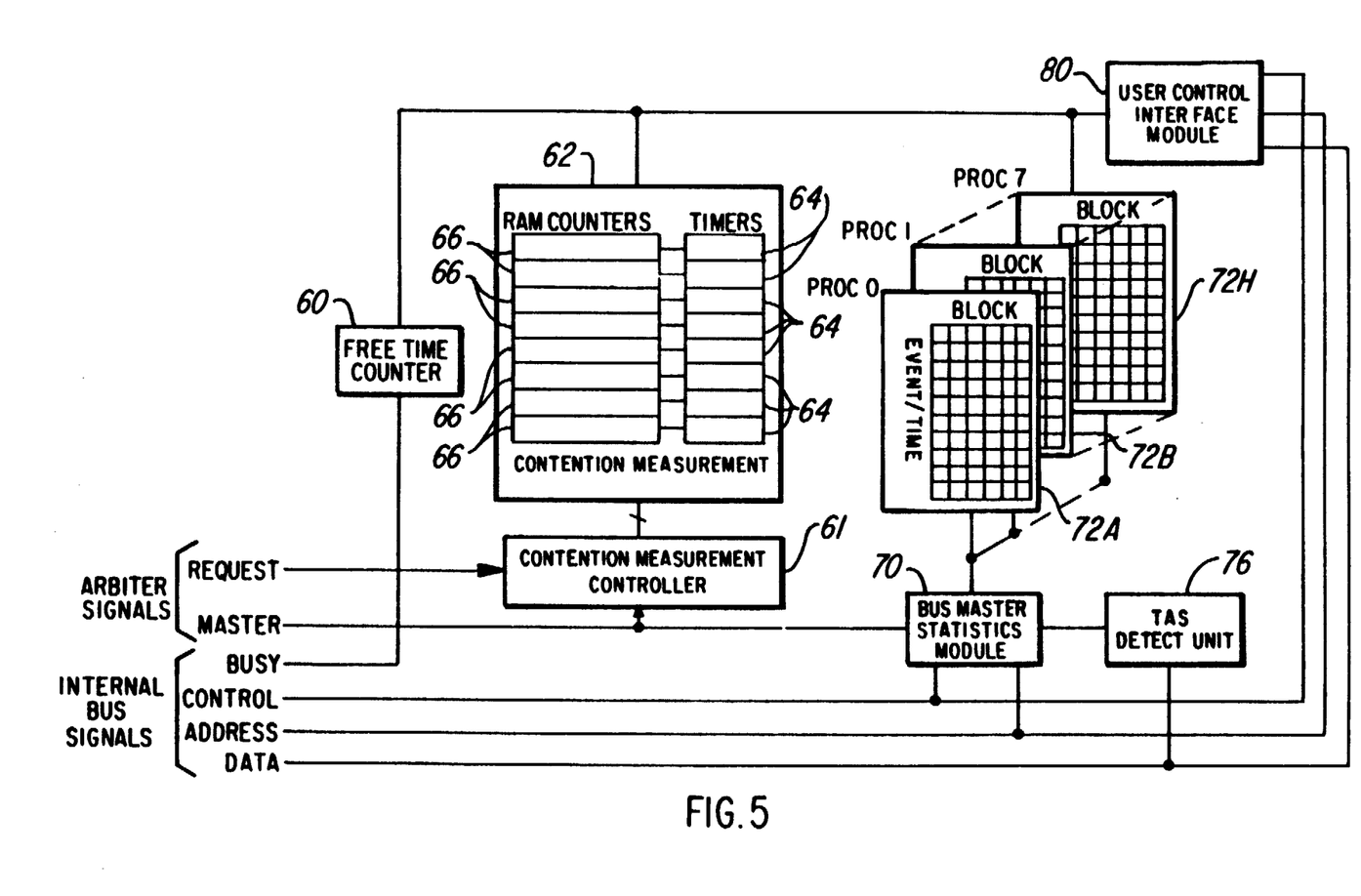
FIG. 5 is a block diagram of an activity monitor constructed according to the teachings of the present invention.

A functional block diagram of the activity monitor 20 is illustrated in FIG. 5. Although the structure and function of the activity monitor 20 will be discussed in conjunction with the multiprocessor system 50 of FIG. 3, those skilled in the art will realize that the activity monitor 20 can also be advantageously and similarly applied to the multiprocessor system 10 shown in FIG. 1. Information is acquired by the activity monitor 20 from the cluster common bus 30 and the cluster common bus arbiter 36. The activity monitor 10 has four basic parts: the free time counter, the bus contention measurement portion, bus cycle statistics portion, and the internal control portion. These items are depicted in FIG. 5 with their external and primary internal connections also shown.

A free time counter 60 monitors the busy signal on the cluster common bus 30 and determines the amount of time the cluster common bus 30 is not in use. The measured data is stored in a fixed memory location.

A contention measurement controller 61 is responsive to signals on the arbiter request and master line for calculating bus contention statistics as discussed below. The contention measurement controller 61 includes address buffers, data buffers, and decoders for monitoring the two input lines thereto. These elements are standard digital logic components that allow the contention measurement controller 61 to collect the contention data and store the results in predetermined memory locations in a contention memory unit 62. The contention memory unit 62 includes a plurality of RAM counters 66 and timers 64 for storing the bus contention statistics; in the FIG. 5 embodiment the contention memory unit 62 includes a number of timers 64 and RAM counters 66 equal to the number of processors 16 in a cluster 51 (i.e., eight). One timer 64 and RAM counter 66 is associated with one processor 16. As is known by those skilled in the art, when a processor 16 requests control of the internal bus 30 a request signal identifying that processor appears on the request line. Likewise when a processor 16 gains control of the internal bus 30 a master signal identifying that processor as the bus master appears on the master line. The contention measurement controller 61 monitors both the request and master lines for those signals and the difference between them to update the appropriate timers 66 to measure the amount of time lost by each processor 16 while waiting for control of the cluster common bus 30. A timer 66 is active and counting when its respective processor 16 has requested control of the internal bus 30 but has not been granted master status by the arbiter. An extended measurement range is obtained by incrementing RAM counters 66 when the associated timer 64 overflows. Any number of timers 64 can be activated simultaneously depending on the traffic density on the cluster common bus 30.

A bus master statistics module 70 includes the necessary interface hardware to collect timing and event statistics that are stored in memory units 72A through 72H, with one memory unit corresponding to each one of the processors 16 illustrated in FIG. 4. Each memory unit 72A though 72H comprises a matrix of memory locations with the abscissa of each memory unit labeled "Block" and the ordinate labeled "Event/Time." In the FIG. 3 embodiment of the multiprocessor system 50 the "Block" abscissa refers to one of the memory units 53, which are one-half Mbyte segments of the global memory 52. In the FIG. 1 embodiment of the multiprocessor system 10, "Block" refers to one of the one Mbyte memory modules 14. The "Event/Time" ordinate refers to one of the event statistics or time measurements that the activity monitor 20 monitors. Each location in the matrix identifies a memory location that is updated by the occurrence of a specific event type for a specific microprocessor 16, that affects a specific memory unit 53. Thus, three parameters are necessary to uniquely define a memory location for updating. The current bus master (from among the processors 16) as indicated by the signal on the master line, identifies one of the memory units 72A through 72H. The memory block 53 that has been accessed, as determined by the signal on the address line, activates the appropriate column in the selected memory unit. Lastly, the type of event, as determined by the signal on the control line, activates the appropriate row in the selected memory unit.

The bus master statistics module 70 includes an execute time calculator for calculating the elapsed time between a processor 16 request for the cluster common bus 30 and the granting of that request. Also included in the bus master statistics module 70 is a counter for determining the time between a read (or write) request and the acknowledgement of the transfer. The counter also counts bus errors.

A TAS detect unit 76 senses if a compound test-and-set operation is being performed and updates the appropriate location in the memory unit 72A through 72H based upon this information. The user control interface module 80 is under user control for initializing the activity monitor 20, starting and stopping each experiment, and collecting the results. Measurement intervals can be started and stopped independently on a per processor basis. Between successive measurement intervals statistics can be reset or allowed to accumulate.

The following is a list of each of the event counting statistics monitored by the activity monitor 20 and stored in the memory blocks 72A through 72H.

a. Number of reads. The activity monitor 20 counts the number of completed read operations performed by a specified processor 16 to one of the memory blocks 53 via the cluster common bus 30. Read operations local to a cluster 12 are not observed. The read part of TAS operations is included in this measurement.

b. Number of writes. In this operation the activity monitor 20 counts the number of completed write operations performed by a specified processor 16 to one of the memory blocks 53 via the cluster common bus 30. Write operations local to cluster 12 are not observed. Also, TAS operations are not included in this measurement.

c. The number of successful TAS operations. Here the activity monitor 20 counts the number of completed TAS operations performed by one of the processors 16 to a given memory block 53 via the cluster common bus 30 that returns a value of zero.

d. Number of failed TAS operations. The activity monitor 20 counts the number of completed TAS operations performed by one of the processors 16 to a given memory block 53 via the cluster common bus 30 that returns a value of one.

e. Number of bus errors. The activity monitor 20 determines the number of bus errors experienced by one of the processors 16 when accessing a location in one of the memory blocks 53.

The activity monitor 20 also provides timing measurements as listed below. When used with the associated event enumeration statistics discussed above, the average time per event can be determined. The timing measurements are stored in the appropriate memory unit 72A through 72H in the memory location as determined by the Event/Time ordinate and the Block abscissa. In one embodiment the unit of time for these timing measurements is 100 nanoseconds.

a. Bus Free Time—The only global time parameter, this measurement determines the total amount of time during any one experiment that the cluster common bus 30 is idle, i.e., there is no processor 16 identified as a bus master.

b. Bus Acquisition Time—This parameter is collected for each processor 16, measuring the total amount of time spent by a processor 16 waiting for the cluster common bus 30. This time is the sum of the intervals between the assertion of bus request by a processor 16 and the acquisition of the cluster common bus 30 by that processor, as indicated by an active signal identifying that processor 16 as the bus master.

c. Bus Error Time—This measurement is the total time a specified processor 16 has spent accessing a particular memory block 53 when a bus error occurred.

d. Write Cycle Time—This is the total time spent by an identified processor 16 writing to a given memory block 53 via the cluster common bus 30 after having become bus master. This measurement includes the time for the write portions of the TAS operation but does not include write cycles terminating in bus errors.

e. Read Cycle Time—This is the total time spent by an identified processor 16 reading from a given memory block 53 via the cluster common bus 30 after becoming bus master. This measurement includes the time associated with the read portion of TAS operations, but excludes those times used by read cycles terminating in bus errors.

To access the event and time data stored in the memory blocks 72A through 72H each of the storage registers has a unique address associated with it so that the stored information may be retrieved for analysis. In one embodiment, the activity monitor 20 is allocated a 64 Kbyte block of contiguous address space within the 24-bit address space recognized by the Motorola MC68000 processor. This address space is represented by the memory units 72A through 72H in FIG. 5. In this embodiment, the most significant byte (8 bits) of the address is set by internal switches within the activity monitor 20. The lower 16 bits (2 bytes) of address for each register is hardwired and defined below. Most of the parameter data registers (in the memory units 72A through 72H) are 32 bits (or 4 bytes) long; the exceptions include: the free time parameter, which is 40 bits long, the overflow flags, which are one bit each, and the utility registers, which can be one or two bytes long.

Figure 6:
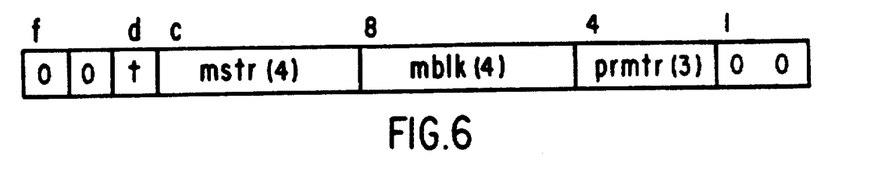
FIGS. 6, 7, 8, 9, 10 and 11 are diagrams illustrating the storage register fields of the activity monitor.
Figure 7:
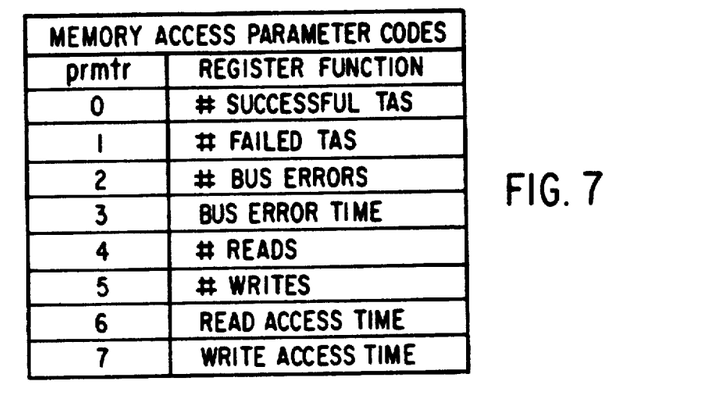

The address format for each of the memory locations in the memory units 72A through 72H where the event and timing measurements are stored (except for the bus free time and the bus acquisition time measurements) is shown in FIG. 6. The bit position for the various fields within the address are indicated by the hex digits above the address parameters in FIG. 6. The field size for those fields having more than one bit is given in parenthesis. In FIG. 6, a single bit t field determines whether the address is specifying the actual data register ($t=0$) or the overflow flag for the specified register ($t=1$). The mstr field identifies the processor 16 with which the register is associated, and the mblk field identifies the memory unit 53 with which the register is associated. The last field of choice, prmtr, is a three bit identifier that selects one of eight possible measured time and event parameters illustrated in FIG. 7. Each of the parameters of FIG. 7 corresponds to one of the measurements discussed above. As stated above, the register addressed by the FIG. 6 address field is 32 bits long. In one embodiment, these 32 bits are segregated into four groups of eight bits each. The right-most 0 and 1 bits of the address field can be used to specify one of these four groups. But as those skilled in the art realize, it is necessary to read all four of the groups for the complete data word. This can be accomplished by calling each of the four groups individually by incrementing the right-most bits from 00 to 11 after each read operation or by programming the microprocessor to do this automatically. The two left-most bits, e and f, are not used in the FIG. 6 embodiment.

For example, if the FIG. 6 address is

```
f   d c     8       4       1
0 0 1 0 1 1 0 0 0 1 1 0 1 1 0 0
```

The 0 and 1 bits identify the first eight-bit storage register associated with the specified parameter. To provide a complete result, the other three eight-bit registers must also be read, by incrementing the 0 and 1 bits from 00 through 11. Bits 2, 3, and 4 identify the measured parameter as the bus error time. Bits 5 through 8 identify the memory unit 53 labeled number 5 in FIG. 3. The next four bits to the left identify the sixth microprocessor in the cluster in which the activity monitor 20 is located. The bit in the d position indicates that the called data storage register contains the measurement data, not an overflow flag.

Figure 8:
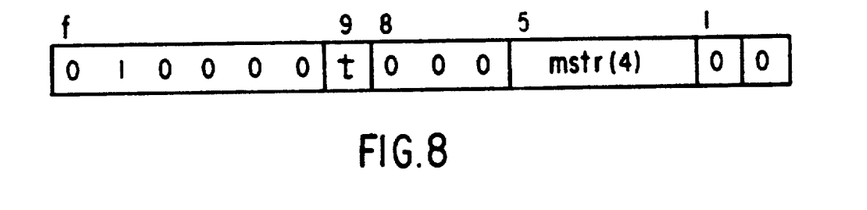

FIG. 8 illustrates the address format for the bus acquisition time measurements and its respective overflow flag. Each processor 16 has a bus acquisition time register. The processor 16 for which the collected statistics are desired is identified by bits 2 through 5 of the FIG. 8 address. The t field (bit 9) selects either the actual register value (t=0) or the Boolean state of the respective overflow flag (t=1). The bus acquisition time register is a 32-bit register comprising four 8-bit registers. Each of these 8-bit registers is accessed by incrementing the right-most 0 and 1 bits from the 00 to 11.

The bus free time parameter is a global parameter that is not dependent on which processor 16 is the master. Thus, the value can be stored in a fixed, predetermined memory location in the memory space comprising the memory blocks 72A through 72H.

Figure 9:
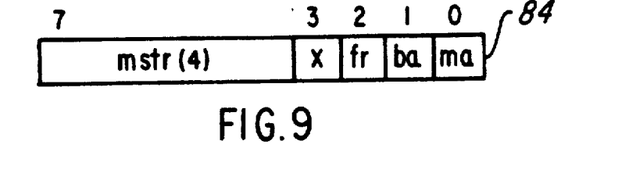

In addition to the registers that store the measured parameters and their respective overflow flags, utility registers are provided for control and status of the activity monitor 20. In one embodiment, these utility registers are in the user control interface module 80 of FIG. 5. The status register 84 shown in FIG. 9 is one byte long and has four active fields, three of which indicate if any overflow flags are set, while the fourth, the four-bit mstr field, provides the physical identification of the accessing processor 16, i.e., the bus master. This field also enables a processor 16 to determine its own physical location in its cluster 12. The fr bit is active (i.e., set to one) if the bus free time register overflowed during an experiment. Otherwise the fr bit is 0. The ba single bit field is active if any of the bus acquisition time registers overflowed during the experiment. If none of these registers overflowed, the ba field of the status register is inactive (set to 0). The ma bit is active if any of the registers storing parameters defined in FIG. 7 have overflowed. The ma field is inactive only if none of these registers has overflowed.

The contents of the status register 84 may be read by any processor 16 and may be cleared by performing a write operation to the status register. When a clear operation is performed, the state of the ma, ba, and fr fields become inactive, but the value of the mstr field is unaffected. Also, the state of the actual overflow flags associated with these registers is unaffected. Thus, it is possible for the status register overflow fields to be clear while the overflow flags the status register actually represent contain one or more overflow flags in the active state.

Figure 10:
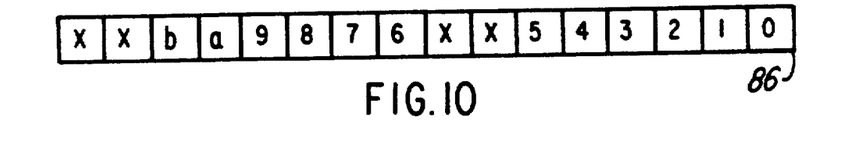

The format of the 16-bit reset register 86 is illustrated in FIG. 10. The reset register 86, which in one embodiment is located in the user control interface module 80, permits software controlled resetting of the contents of the bus acquisition register and memory access parameter registers (defined in FIG. 7) and their associated overflow flags. These registers are cleared in blocks according to the processor 16 with which they are associated. All of the registers and overflow flags related to the operation of an identified processor 16 are cleared simultaneously. Any processor 16 can cause the registers of another to be cleared. The x's indicate inactive bits, i.e., "don't care" bits. The other bits in the reset register 86 are designated according to the processor with which they are associated. For every 0 bit written to the reset register, the corresponding processors block of registers and flags are cleared. A 1 bit written to the reset register causes no change in the state of that processors registers. For example, writing ffff to the reset register will have no effect on the system, while writing a 0000 or c0c0 will clear all processor oriented registers and flags. Writing fbff would clear the registers associated with processor 8.

Figure 11:
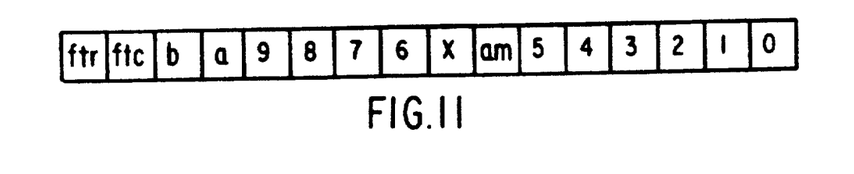

A control register 88, the format of which is shown in FIG. 11, permits timing by the activity monitor 20 to be enabled and disabled as desired under processor control. This allows start and stop times of an experiment conducted by the activity monitor 20 to be defined by the application program. The control register 88 also makes it possible to create windows of time during which measurements are taken, but outside of which the activity monitor 20 is in a static state. This capability also makes it possible to acquire medium to high time resolution measurements, examining only short pieces of execution.

Like the reset register 86, the control register 88 references of registers it controls by the physical identity of the processor 16 with which these blocks are associated. A bit of the control register 88 is assigned to each block in the same way as in the reset register 86. In addition, two bits are assigned to control the bus free time register and its overflow flags, and one bit is allocated to determine whether the memory blocks are defined according to physical modules or contiguous address space. The format of the control register 88 is illustrated in FIG. 11. The bus free time register and its overflow flag is reset every time a 0 is written into the ftr bit of the control register 88; the bus free time register is turned on by writing a 0 to the ftc bit and turned off by writing a 1 to that bit. The numbered bits 0 through 7 in the control register 88 relate to a processor 0 through 7 of FIG. 4. A 0 written to one of those positions turns on the register associated with that identified processor, while a 1 written to that bit will turn these registers off. The bits 8, 9, a, and b are extra bits intended for use with multiprocessor systems having more than eight processors 16 in a cluster 51.

The am bit determines the address mode and distinguishes between two ways of delineating the global memory, comprising either the memory modules 14 in the FIG. 2 embodiment or the memory blocks 53 in the FIG. 4 embodiment. The multiprocessor system 10 shown in FIG. 1 distributes the global memory 14 among eight clusters with one Mbyte of contiguously addressed global memory in each cluster. The multiprocessor system 50 shown in FIG. 3 employs a cross-bar switch that connects to a 16-way interleaved global memory 52. Each of the memory blocks 53 in the global memory 52 comprises a one-half Mbyte block of memory. The address mode (am) bit chooses between using address bits 1, 2, 3 and 4 to select the physical communication and storage media for the multiprocessor system 50 or address bits that selects among clusters 20 of the multiprocessor system 10.

Although several embodiments in accordance with the present invention have been shown and described, it is understood that the same is not limited thereto but is susceptible to numerous changes and modifications as known to persons skilled in the art, and we therefore do not wish to be limited to the details shown and described herein but intend to cover all such changes and modifications as are obvious to one of ordinary skill in the art.

What is claimed:

1. An activity monitor for monitoring activity in a multiprocessor system having a plurality of processor interconnected via an internal bus and a plurality of memory blocks with which the processors communicate for storing and retrieving data during read, write, and test-and-set operations, wherein at any time only one processor can operate on the internal bus, said activity monitor comprising:
   a plurality of memory units wherein each one of said plurality of memory units includes a plurality of storage locations;
   first means for determining the processor that is operating on the internal bus;
   second means for determining the current function being performed by the processor operating on the internal bus;
   third means for determining the current memory block being utilized by the current processor in performing the current function;
   wherein each one of said plurality of memory units is associated with one of the plurality of processors, and wherein within each one of said plurality of memory units a group of said plurality of storage locations is associated with one memory block, and further wherein each storage location within said group is associated with one of the functions, such that each processor is associated with a memory unit and each storage location within each memory unit is associated with a function and memory block pair;
   means responsive to said first, said second and said third means for storing information relative to the current processor, the current memory block, and the current function in said unique storage location associated with the current function, the current memory block and the current processor.

2. The activity monitor of claim 1, wherein the information stored includes the number of read operations that the current processor has made to the current memory block.

3. The activity monitor of claim 1, wherein the information stored includes the number of write operations that the current processor has made to the current memory block.

4. The activity monitor of claim 1, wherein the information stored relates to the number of failed test-and-set operations that the current processor has made to the current memory block.

5. The activity monitor of claim 1, wherein the information stored includes the number of successful test-and-set operations that the current processor has made to the current memory block.

6. The activity monitor of claim 1, wherein the information stored includes the time the current processor spent reading to the current memory block.

7. The activity monitor of claim 1, wherein the information stored includes the time the current processor spent writing to the current memory block.

* * * * *